Jan. 23, 1962   B. L. TARMY ETAL   3,018,235
RADIOCHEMICAL HYDROCARBON CONVERSION PROCESS
Filed June 26, 1956
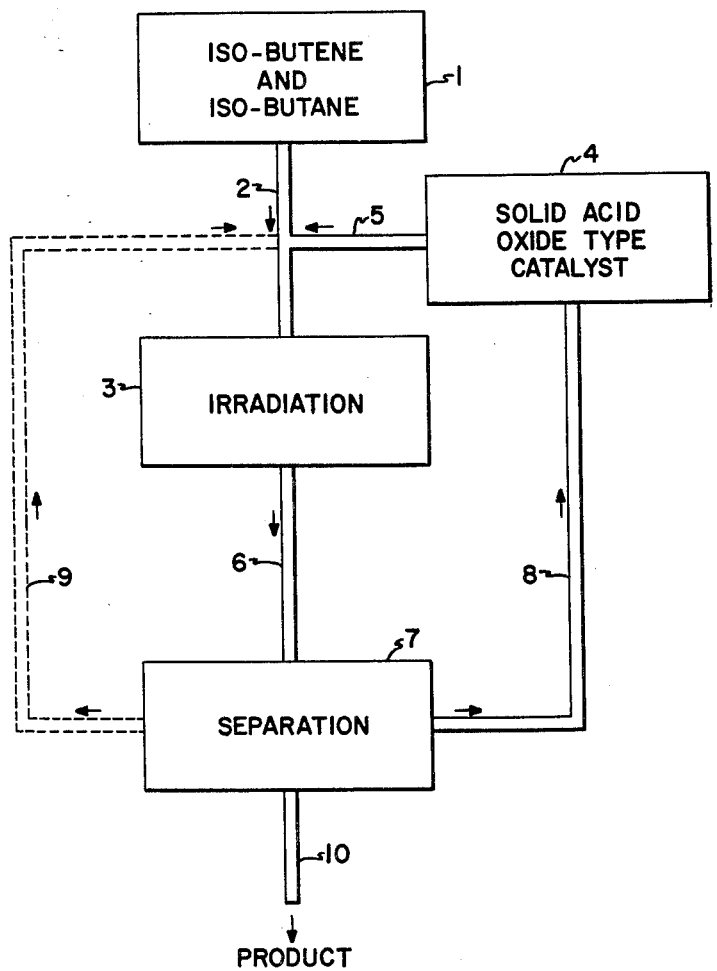
Barry L. Tarmy
Robert B. Long      Inventors
By L. A. Strimbeck   Attorney 3,018,235
RADIOCHEMICAL HYDROCARBON
CONVERSION PROCESS
Barry L. Tarmy, Cranford, and Robert B. Long, Wanamassa, N.J., assignors to Esso Research and Engineering Company, a corporation of Delaware
Filed June 26, 1956, Ser. No. 593,891
4 Claims. (Cl. 204—154)

This invention relates to the production of naphthenes and aromatics from light olefins. It is particularly concerned with the catalytic conversion of isobutene in the presence of a solid acid oxide conversion catalyst, preferably under the influence of high intensity ionizing radiation.

In brief compass, this invention proposes an isobutene conversion process which comprises converting isobutene in the presence of an acid oxide conversion catalyst, e.g., silica-alumina. While a vapor phase system and higher temperatures can be used, it is preferred to use a pressure sufficient to maintain substantially liquid phase conditions, and a temperature below 300° F.

In a preferred embodiment, the isobutene is reacted in admixture with isobutane.

In a much preferred embodiment, the conversion is carried out in the presence of high intensity ionizing radiation comprising gamma rays with or without neutrons.

It has now been found when isobutene or isobutene/isobutane mixtures are reacted over a catalyst such as silica-alumina, that the unsaturate is converted to naphthenes and/or aromatics.

According to a preferred embodiment of the present invention, it has further been found that when the catalytic isobutene reaction is carried out in the presence of high intensity radiation, the heavy polymer formed by the reaction which tends to deposit on the catalyst can be made to undergo continuous degradation. The effectiveness of the catalyst is thereby greatly increased.

The invention is primarily concerned with the conversion of isobutene. It is preferred that the reactant stream or fresh feed contain at least 5% isobutene. Isobutane will, however, enter into the reaction and it is a preferred embodiment of this invention to react mixtures of isobutane and isobutene. The isobutane/isobutene ratio used ranges from 1 to 100. The isobutene can be diluted, preferably with normal paraffins such as propane, and under the proper conditions, the diluent may react to some extent with the isobutene or products.

The catalyst used by the present invention is a porous solid acid oxide type of catalyst useful in alkylation, polymerization and cracking reactions. Examples of such catalysts are dried and/or calcined silica, alumina, magnesia, titania, zirconia, boria, and mixtures thereof. A silica containing catalyst is much preferred. The materials can be derived from natural sources such as bauxite, or can be manufactured. The catalyst preferably has a size in the range of 0–1000 microns, but may be much larger if desired, e.g., one inch or more in size. The catalyst has, preferably, a surface area over 50 $M^2$/gr. and a pore size above 20 A.

In some cases there can be distended or impregnated on this catalyst, additional active catalytic components such as oxides or salts of boron, calcium, cerium, molybdenum and lithium.

It is also useful when applying neutron irradiation, to add to the catalyst or to the reaction mixture, materials, i.e., isotopes, that might be termed "radiochemical accelerators" such as boron 10 and lithium 6, which give off high intensity alpha particles upon capture of a neutron; or materials like cadmium 113, gold 197 and indium 115, which give off gamma rays or beta particles upon photon incidence or capture of a neutron. These materials can be used as pure isotopes, as elements containing the isotopes, or as compounds thereof. They can be carried in a solution, either as water or oil soluble compounds, or can be impregnated on inerts or on the catalyst.

While the present reaction can be carried out in liquid or gas phase, it is much preferred to carry it out in the liquid phase because there is less coke and heavy polymer formed, the selectivity is better, and when using irradiation, there is more radiation absorbed per unit volume. The pressure preferably is, therefore, sufficient to maintain substantially liquid phase conditions, although it may range from 0 to 5000 p.s.i.g. The temperature is preferably in the range of −50° to 300° F. for liquid phase reactions, and is in the range of 100° to 800° F. for vapor phase reactions. The treating time is in the range of 1 to 60 minutes.

The irradiation dosage, when essentially gamma radiation is used, is at least $10^4$ roentgens; and if neutron and gamma radiation is used, the dosage is preferably at least 0.02 cal./gr. The catalyst/feed ratio on a weight basis is in the range of 0.1 to 10.

The following description of the drawing showing a preferred embodiment wherein the reactants are irradiated, attached to and forming a part of this specification, will serve to make this invention clear.

In the drawing, the feed material is introduced from source 1 by line 2 into reaction chamber 3. The catalyst is supplied from source 4 by line 5 and mixed with the reactants. The combined reactant stream is exposed to radiation in reaction zone 3. While the use of radiation to energize the reaction and to remove polymer from the catalyst is illustrated and preferred, it will be understood the process will proceed without radiation. The processing conditions given apply to the process with or without radiation.

The radiation may be obtained from waste materials from nuclear reactors such as from spent fuel elements, or from artificially produced isotopes such as cobalt 60, but it is preferred to carry out the conversion within a nuclear reactor such as an atomic pile. The reactant stream can simply be flowed in pipes through the nuclear reactor, being exposed to the high intensity ionizing radiation. Moderators such as carbon, water or hydrocarbons can be employed. In some cases the feed stream itself can serve as a moderator. With a nuclear reactor, it is preferred to have a neutron flux in the reaction zone of at least $10^8$ neutrons/$cm^2$/sec.

A suspensoid system is shown in the drawing, i.e., the catalytic solids are carried by the hydrocarbon reactant through the reaction zone. The conversion catalyst can exist, however, as a fixed, fluid or gravitating bed within the reaction zone 3.

The irradiated material is transferred by line 6 to a separation zone 7. The separation zone comprises means for recovering the catalyst, such as by distillation, filtration, absorption, etc. The recovered catalyst can be directly recycled by line 8 if desired, or can be first treated as by burning, steaming and chemical reworking, to remove contaminates and/or improve its properties before being recycled. When the catalytic bed is maintained within the radiation source, it can be treated or regenerated as needed within the source, or can be periodically removed and treated.

The reaction products are also separatd in zone 7 as by distillation, extraction, crystallization, absorption, and the like. Unreacted feed material, if any, can be recovered and recycled by line 9 if desired. The remaining product or products are removed by line 10.

Separation zone 7 also includes means for removing and/or neutralizing radioactive waste products. Such means can include storage tanks to permit decay of radioactivity, ion exchange apparatus, gas absorption apparatus, distillation columns, and solvent extraction units.

The invention will be more fully understood by reference to the following examples.

The catalyst used in these examples was a commercially available silica-alumina catalyst. This catalyst is made in general by precipitating alumina from an aluminum sulfate solution on previously precipitated silica, by the addtion of ammonia. The precipitate is then washed, dried, and calcined for several hours at temperatures of about 1200° F. It contains 13% alumina. The calcined material is pulverized and formed into $3/8$ x $3/16$-inch diameter pills. The catalyst has a surface area of about 500 M.$^2$/gr.

The feed stream was contacted with the catalyst in the absence and in the presence of radiation obtained from an artificially produced cobalt 60 source having a rating of about 3100 curies. The runs were carried out in the following manner: An isobutane-isobutene mixture was pumped as a liquid from a pressurized blowcase to a heated, insulated reactor containing the catalyst, coiled around a hole into which the Co$^{60}$ in the form of a pipe could be placed. Liquid product was collected in a water condenser. The unreacted feed was collected in a Dry Ice trap. The gas product was metered and sampled for analysis. Paired runs with and without radiation were carried out.

EXAMPLE 1

In this example, a mixture of 7 parts by weight of isobutane and one part by weight of isobutene was passed in vapor phase over the silica-alumina catalyst at a pressure of 600 lbs., and at temperatures of 400° and 700° F.

*Table I*

| Temp., °F | 400 | | 400 | | 700 | |
|---|---|---|---|---|---|---|
| Pressure, p.s.i.g. | 600 | | 600 | | 600 | |
| Feed Rate, W./W./Hr. | 0.37 | | 0.90 | | 0.85 | |
| Dose, Roentgens | 25,300 | 0 | 10,400 | 9 | 8,100 | 0 |
| Heavy Polymer, Wt. percent on Feed | 16.5 | 22.9 | 17.2 | (?) | 3.3 | 5.8 |
| Liq. Prod., Wt. percent on Feed | 6.6 | 2.3 | 6.5 | 2.6 | 1.6 | 1.4 |
| Percent Olefin Reacted | 98.0 | 98.4 | 93.8 | 94.5 | 91.5 | 92.8 |

The liquid product obtained was about 30% aromatic.

EXAMPLE 2

In this example a 7:1 by weight mixture of isobutane/isobutene was passed over the catalyst in liquid phase at 600 lbs., and at temperatures of 200° and 250° F. A substantial amount of naphthenes boiling at about 355° F. and having a molecular weight of 168 were obtained.

*Table II*

| | | | | |
|---|---|---|---|---|
| Feed Rate, W./hr./W. | 2.52 | 2.45 | 2.53 | 2.42 |
| Temperature, °F. | 250 | 250 | 200 | 200 |
| Dose, Roentgens | 21,400 | 0 | 26,700 | 0 |
| Yields, Wt. Percent Feed: | | | | |
| Total Products | 102.7 | 97.4 | 95.4 | 93.1 |
| "Polymer" | 0 | 2.6 | 4.6 | 6.9 |
| C$_5$/330° F. | 3.3 | ¹1.4 | 1.6 | 0.9 |
| 330/430° F. | 6.5 | ²6.4 | 7.0 | 7.1 |
| 430° F.+ Bottoms | 0.9 | 1.1 | 0.5 | 1.2 |
| Percent Olefin Reacted | 96.1 | 98.9 | 98.8 | 100.0 |
| Moles Olefin/Moles Isobutane Reacted | (³) | 11.36 | 3.16 | 2.63 |
| Moles Olefin/Moles Total Paraffin Reacted | (³) | 7.02 | 2.77 | 2.36 |
| 0/330° F. | | | | |
| Vol. Percent Aromatics | 1.0 | ¹0.0 | 1.1 | 1.1 |
| Vol. Percent Olefins | 99.0 | ¹100.0 | 98.9 | 96.8 |
| Vol. Percent Saturates | 0.0 | ¹0.0 | 0.0 | 2.1 |
| 330/430° F.— | | | | |
| Vol. Percent Aromatics | 0.0 | ²0.0 | 0.0 | 0.0 |
| Vol. Percent Olefins | 3.1 | ²5.0 | 8.8 | 11.3 |
| Vol. Percent Saturates ⁴ | 96.9 | ²95.0 | 91.2 | 88.7 |
| West Gravity: | | | | |
| 0/330° F. | 0.7256 | ¹0.7366 | 0.7238 | 0.7260 |
| 330/430° F. | 0.7674 | ²0.7682 | 0.7862 | 0.7868 |
| Bromine Number, cgs./cc.: | | | | |
| 0/330° F. | 134.4 | ¹104.6 | 133.0 | 129.1 |
| 330/430° F. | 80.8 | ²81.4 | 71.6 | 77.4 |
| Aniline Point, °F.: | | | | |
| 0/330° F. | 144 | ¹135 | 110 | 111 |
| 330/430° F. | 163 | ²1,632 | 164 | 164 |
| Refractive Index @ 20° C.: | | | | |
| 0/330° F. | 1.4110 | ¹1.4182 | 1.4112 | 1.4122 |
| 330/430° F. | 1.4320 | ²1.4328 | 1.4329 | 1.4328 |

¹ 0/350° F.
² 350/430° F.
³ No isobutane reacted.
⁴ Mainly naphthene which boils at 355° F. and whose whole molecular weight is 168.

The principal reactions appear to be dimerization of isobutene, followed by either alkylation of the dimer with isobutene or further polymerization of the dimer and then rearrangement to form a 12-carbon naphthene with 5 or 6 carbon atoms in the ring. Competing with these reactions is the formation of high molecular weight polymer from isobutene which is deposited on the catalyst.

In many cases, particularly at temperatures below 200° F., the formation of this heavy polymer is not too detrimental. It is much preferred, however, to carry out the reaction in the presence of gamma radiation. The data show that relatively small radiation doses appreciably suppress polymer formation, and doses in the order of 10⁶ roentgens should completely suppress polymer formation.

Having described this invention, what is sought to be protected by Letters Patent is succinctly set forth in the following claims.

What is claimed is:

1. A process comprising irradiating a hydrocarbon stream containing isobutane and isobutene, the ratio of isobutane-isobutene being in the range of from 1:1 to 100:1, with at least 10⁴ roentgens of high intensity ionizing radiation comprising gamma rays at a temperature in the range of —50 to 800° F. and a pressure in the range of 0 to 5000 p.s.i.g., and in the presence of a catalyzing amount of a solid acid oxide catalyst selected from the class consisting of silica, alumina, magnesia, titania, zirconia, boria, and mixtures thereof having a surface area over 50 square meters per gram and recovering a total product, the 330/430° F. fraction thereof being predominantly naphthenes.

2. The process of claim 1 wherein said hydrocarbon stream is maintained substantially in the liquid phase during the irradiation.

3. The process of claim 1 wherein said high intensity ionizing radiation also comprises neutrons from a nuclear reactor and the neutron flux in the reaction zone is at least 10⁸ neutrons/cm.²/sec.

4. The process of claim 1 wherein said solid acid oxide type of catalyst consists essentially of silica and alumina and wherein said 330/430° F. fraction contains at least 90 wt. percent of naphthenes.

(References on following page)

References Cited in the file of this patent

UNITED STATES PATENTS

| | | |
|---|---|---|
| 2,404,628 | Grenko et al. | July 23, 1946 |
| 2,516,848 | Brasch | Aug. 1, 1950 |
| 2,743,223 | McClinton | Apr. 24, 1956 |
| 2,781,408 | Witt et al. | Feb. 12, 1957 |
| 2,798,890 | Waterman et al. | July 9, 1957 |
| 2,803,684 | Frey et al. | Aug. 20, 1957 |
| 2,850,546 | Pevere et al. | Sept. 2, 1958 |
| 2,872,396 | Wilson et al. | Feb. 3, 1959 |

FOREIGN PATENTS

| | | |
|---|---|---|
| 665,263 | Great Britain | Jan. 23, 1952 |

OTHER REFERENCES

Davidson: "Journal of Applied Physics," vol. 19, No. 5, pp. 427–433, May 1948.